(12) United States Patent
Satoh et al.

(10) Patent No.: US 8,094,888 B2
(45) Date of Patent: Jan. 10, 2012

(54) IMAGE PROCESSOR AND IMAGE PROCESSING METHOD TO SENSE AN OBJECT AND THE DISTANCE TO OBJECT

(75) Inventors: Hiroshi Satoh, Yokohama (JP); Shogo Kitano, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1158 days.

(21) Appl. No.: 11/889,059

(22) Filed: Aug. 8, 2007

(65) Prior Publication Data

US 2008/0044060 A1 Feb. 21, 2008

(30) Foreign Application Priority Data

Aug. 10, 2006 (JP) .................................. 2006-218572
Jul. 20, 2007 (JP) .................................. 2007-189316

(51) Int. Cl.
*G06K 9/00* (2006.01)
(52) U.S. Cl. ......... 382/106; 382/190; 382/100; 382/107
(58) Field of Classification Search .................. 382/100, 382/103, 107, 115, 118, 153, 154, 190, 223
See application file for complete search history.

(56) References Cited

U.S. PATENT DOCUMENTS

| 6,810,135 B1 * | 10/2004 | Berenz et al. ................. 382/118 |
| 6,858,827 B2 | 2/2005 | Sugiyama et al. |
| 2005/0111698 A1 * | 5/2005 | Kawai ........................... 382/103 |

FOREIGN PATENT DOCUMENTS

JP 2003-169251 A 6/2003

* cited by examiner

*Primary Examiner* — Brian Q Le
*Assistant Examiner* — Edward Park
(74) *Attorney, Agent, or Firm* — Foley & Lardner LLP (57) ABSTRACT

An image processor, includes: an image pickup part configured to pick up a pickup image of a certain area; an irradiator configured to irradiate at least a part of the certain area for the pickup image picked up by the image pickup part; an extractor configured to extract, as an irradiation image, a light irradiated from the irradiator, the irradiation image being extracted from the pickup image picked up by the image pickup part; an image generating part configured to generate an irradiation removed image which is obtained by removing the irradiation image from the pickup image; an object recognizer configured to recognize an object in the certain area, based on the irradiation removed image generated by the image generating part; and a distance sensor configured to sense a distance to the object sensed by the object recognizer.

8 Claims, 11 Drawing Sheets

IMAGE PROCESSOR AND IMAGE PROCESSING METHOD TO SENSE AN OBJECT AND THE DISTANCE TO OBJECT

BACKGROUND OF THE INVENTION

1. Field of the Invention

The present invention relates to an image processor and an image processing method. Based on an image picked up by an image pickup part, the image processor and the image processing method can recognize a peripheral object and sense a distance to the peripheral object.

2. Description of the Related Art

Conventionally known technology includes a camera which is set in a vehicle. The camera picks up a peripheral image of the vehicle. Based on the thus picked up image, the conventional technology senses a peripheral object and a distance to the peripheral object. Japanese Patent Application Laid-Open No. 2003-169251 (=JP2003169251) {having family including U.S. Pat. No. 6,858,827 (B2) and US2003052252 (A)} discloses a technology which alternately repeats i) irradiating an image pickup area of the camera and ii) non-irradiating the same, thus 1) sensing a peripheral object based on an image (object sensing image) obtained during the non-irradiating and 2) calculating a distance to the peripheral object based on an image (distance sensing image) obtained during the irradiating.

However, the conventional technology in JP2003169251 for alternately obtaining the object sensing image and the distance sensing image, as the case may be, fails to serially sense the peripheral object. Therefore, the conventional technology, as the case may be, erroneously senses (recognizes) an object as a different object even when the thus sensed (recognized) object is the same object.

SUMMARY OF THE INVENTION

It is therefore an object of the present invention to provide an image processor and an image processing method which are capable of sensing an object and a distance to the object in such a manner as to serially sense (recognize) the object.

According to a first aspect of the present invention, there is provided an image processor, comprising: an image pickup part configured to pick up a pickup image of a certain area; an irradiator configured to irradiate at least a part of the certain area for the pickup image picked up by the image pickup part; an extractor configured to extract, as an irradiation image, a light irradiated from the irradiator, the irradiation image being extracted from the pickup image picked up by the image pickup part; an image generating part configured to generate an irradiation removed image which is obtained by removing the irradiation image from the pickup image; an object recognizer configured to recognize an object in the certain area, based on the irradiation removed image generated by the image generating part; and a distance sensor configured to sense a distance to the object recognized by the object recognizer.

According to a second aspect of the present invention, there is provided an image processing method, comprising: picking up a pickup image of a certain area; irradiating at least a part of the certain area for the pickup image picked up by the picking up operation; extracting, as an irradiation image, a light irradiated from the irradiating operation, the irradiation image being extracted from the pickup image picked up by the picking up operation; generating an irradiation removed image which is obtained by removing the irradiation image from the pickup image; recognizing an object in the certain area, based on the irradiation removed image generated by the generating operation; and sensing a distance to the object recognized by the recognizing operation.

According to a third aspect of the present invention, there is provided an image processor, comprising: means for picking up a pickup image of a certain area; means for irradiating at least a part of the certain area for the pickup image picked up by the picking up means; means for extracting, as an irradiation image, a light irradiated from the irradiating means, the irradiation image being extracted from the pickup image picked up by the picking up means; means for generating an irradiation removed image which is obtained by removing the irradiation image from the pickup image; means for recognizing an object in the certain area, based on the irradiation removed image generated by the generating means; and means for sensing a distance to the object recognized by the recognizing means.

The present invention eliminates the need for alternately obtaining an object sensing image and a distance sensing image, allowing a serial sensing (recognizing) of the object.

The other object(s) and feature(s) of the present invention will become understood from the following description with reference to the accompanying drawings.

BRIEF DESCRIPTION OF THE DRAWINGS

FIG. 3A is a schematic view including an irradiation pattern projected ahead of the vehicle, while

FIG. 10A shows an irradiation image of an irradiation pattern included in the distance sensing image at a previous image pickup, while

DESCRIPTION OF THE PREFERRED EMBODIMENTS

In the following, various embodiments of the present invention will be described in detail with reference to the accompanying drawings.

For ease of understanding, the following description will include various directional terms, such as left, right, upper, lower, forward, rearward and the like. However, such terms are to be understood with respect to only a drawing or drawings on which the corresponding part of element is illustrated.

Hereinafter, an image processor under the present invention is to be set forth in detail, referring to drawings.

First Embodiment

Figure 1:
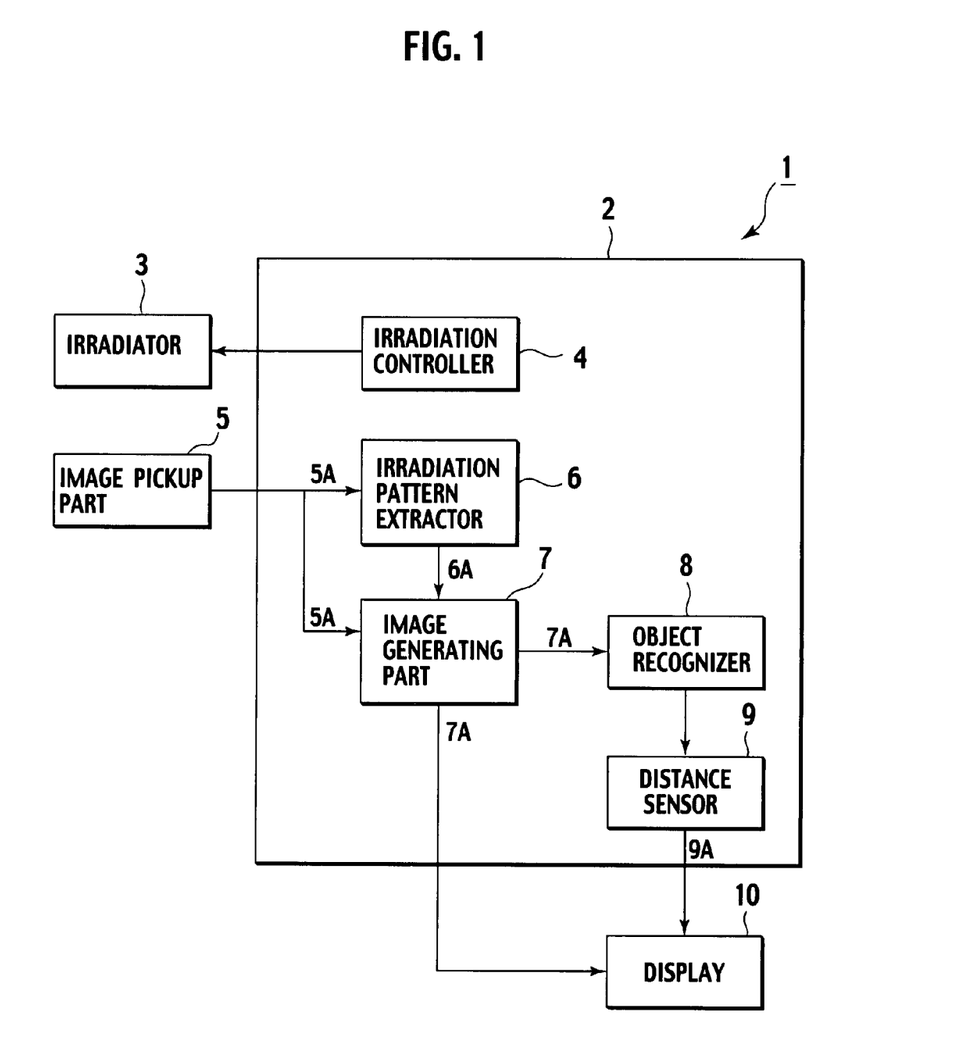
FIG. 1 is a block diagram of an image processor, according to a first embodiment of the present invention.

A block diagram of the image processor is to be explained referring to FIG. 1, according to a first embodiment of the present invention.

[General Structure of Image Processor 1]

As shown in FIG. 1, an image processor 1 according to the first embodiment of the present invention mainly includes an irradiator 3, an irradiation controller 4, an image pickup part 5, an irradiation pattern extractor 6, an image generating part 7, an object recognizer 8, a distance sensor 9, a display 10, and an administrative processor 2. The administrative processor 2 administratively controls each of the above elements of the image processor 1.

[Details of Each Structural Element]

Figure 2:
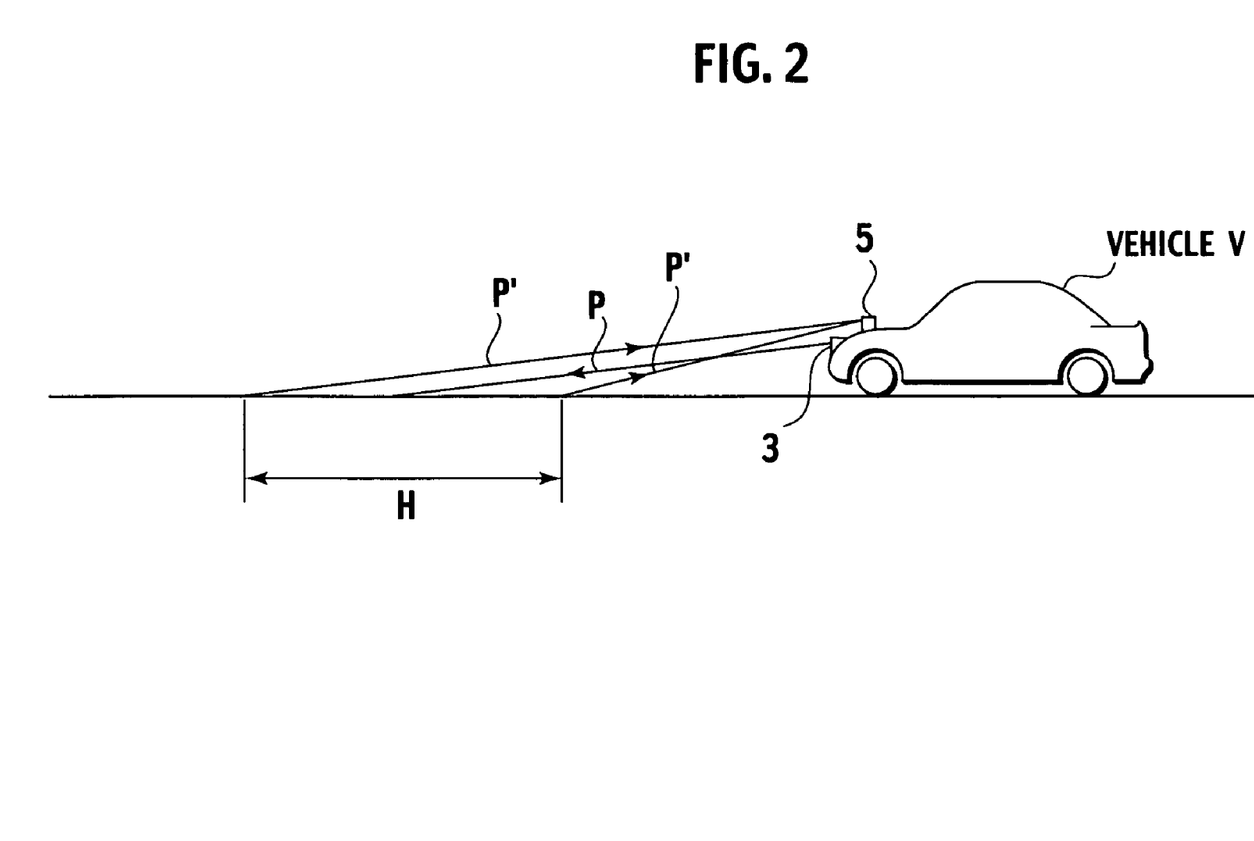
FIG. 2 is a schematic of a vehicle including the image processor under the present invention.

To an image pickup area H picked up by the image pickup part 5, the irradiator 3 sends an irradiation pattern P necessary for sensing a distance D between an object 15 and a vehicle V, as shown in FIG. 2. Herein, wavelength of an irradiated light is not especially limited, therefore a visible light or an infrared light can be used according to situations. The image pickup area H is defined by two image pickup patterns P', P'.

Making an on-off control of the irradiator 3 at a certain time interval, the irradiation controller 4 controls period of the irradiation pattern P. The above certain time interval of the on-off control is, for example, 33 msec (shortest) when an image pickup element for an ordinary video camera is used as the image pickup part 5. The certain time interval of the on-off control is, however, to be determined based on i) travel speed of the object 15 to be calculated or ii) frequency spectrum of external light.

As shown in FIG. 2, the image pickup part 5 picks up an image of the image pickup area H including the irradiation pattern P sent from the irradiator 3. The thus picked up image serves as a distance sensing image 5A (otherwise referred to as "pick up image" or "original image"). Then, the image pickup part 5 outputs the distance sensing image 5A to the irradiation pattern extractor 6 and the image generating part 7 so that the distance sensing image 5A is outputted to the distance sensor 9.

From the distance sensing image 5A, the irradiation pattern extractor 6 extracts an image (hereinafter, referred to as "irradiation image 6A") corresponding to the irradiation pattern P. Then, the irradiation pattern extractor 6 inputs the thus extracted irradiation image 6A to the image generating part 7.

<Method for Extracting Irradiation Image 6A>

Figure 3A:
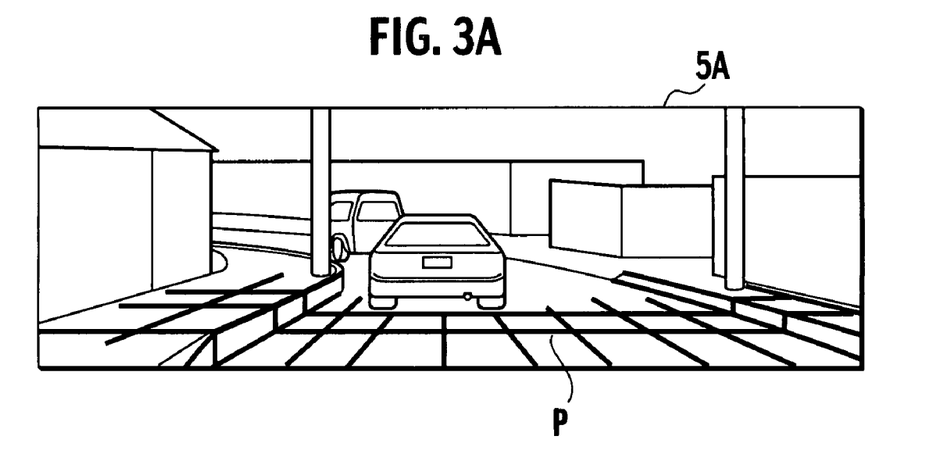
Figure 3B:
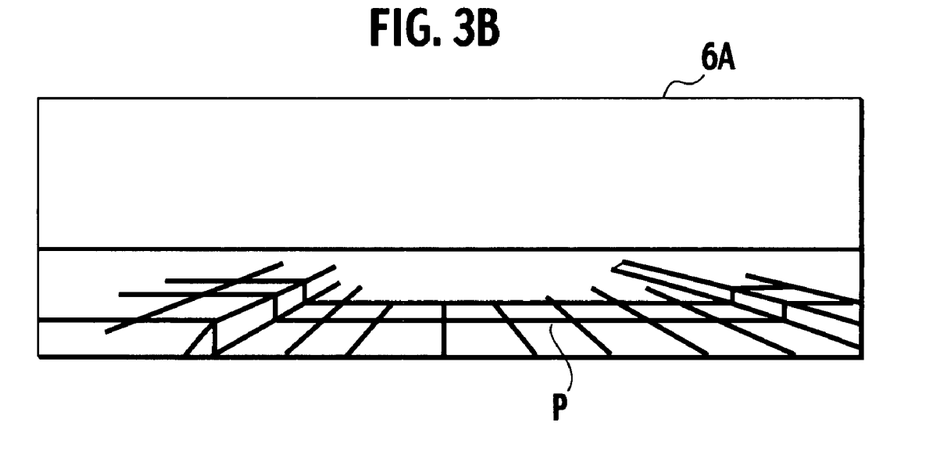
FIG. 3B shows an irradiation image extracted.

Hereinafter, a method for extracting the irradiation image 6A is to be set forth. Including an external light other than the light by the irradiation pattern P, the distance sensing image 5A picked up by the image pickup part 5 has various space frequencies, as shown in FIG. 3A. Herein, since the irradiation controller 4 makes the on-off control of the irradiator 3 at the certain time interval {for example, 33 msec (shortest) as set forth above}, the irradiation pattern P is caused to have a certain time interval (hereinafter, referred to as "irradiation period"). The irradiation period is, for example, 33 msec (shortest) when an image pickup element for an ordinary video camera is used as the image pickup part 5. The irradiation period is, however, to be determined based on i) travel speed of the object 15 to be calculated or ii) frequency spectrum of external light. Then, an image signal having a period substantially equal to the irradiation period is extracted using a band pass filter, thereby extracting the irradiation image 6A only, as shown in FIG. 3B.

With the distance sensing image 5A inputted from the image pickup part 5 and the irradiation image 6A inputted from the irradiation pattern extractor 6, the image generating part 7 generates an object sensing image 7A (otherwise referred to as "irradiation removed image") not including the irradiation image 6A. Specifically, taking a difference between a luminance of the distance sensing image 5A and a luminance of the irradiation image 6A, the image generating part 7 can generate the object sensing image 7A shown in FIG. 4 (i.e., 7A=5A−6A). After generating the object sensing image 7A, the image generating part 7 inputs the object sensing image 7A to the display 10.

Figure 4:
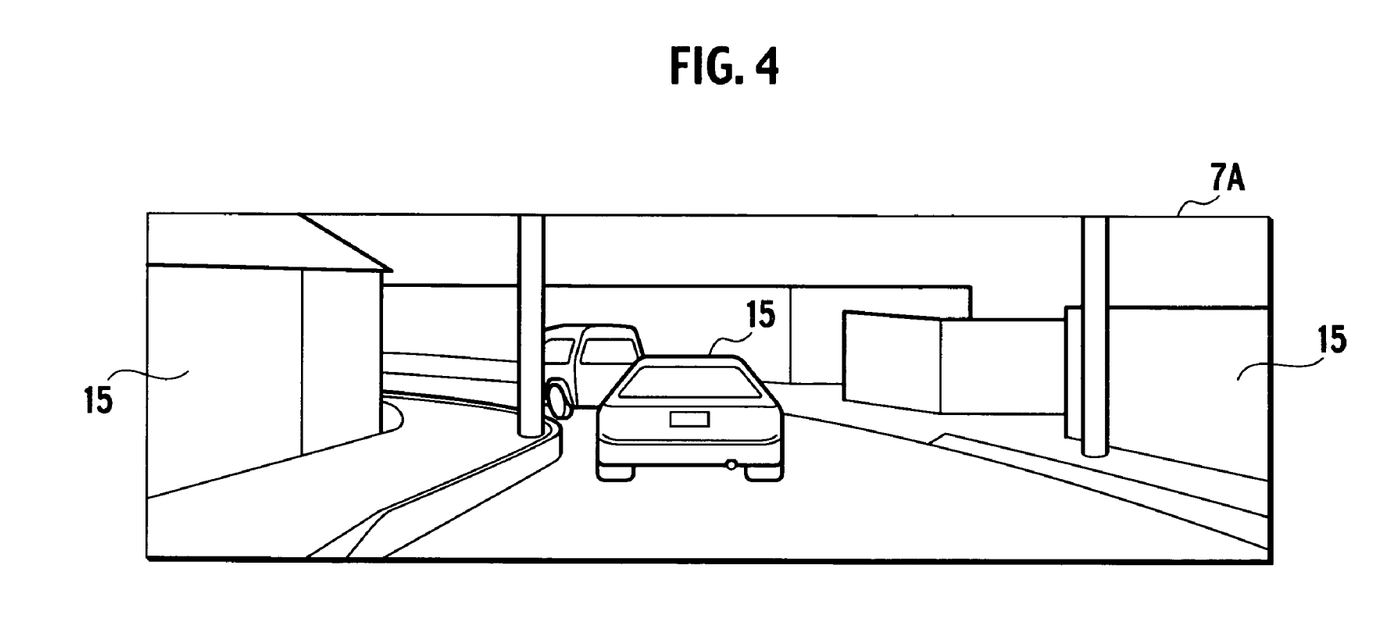
FIG. 4 shows an example of an image with the irradiation image removed.

The object recognizer 8 recognizes (senses) the object 15 in the object sensing image 7A inputted from the image generating part 7. For example, the object sensing image 7A and the distance sensing image 5A are drawn by a luminance which is obtained based on a luminance distribution or a temperature distribution ahead of the vehicle V. Specifically, the object 15 ahead of the vehicle V is drawn with a color or hue according to the luminance or temperature of the object 15. More specifically, when another vehicle (object 15) is present in a road center part ahead of the vehicle V and right and left side walls (object 15) are present, as shown in FIG. 4, the another vehicle (object 15) and the right and left side walls (object 15) are drawn in the object sensing image 7A. Then, comparing i) the object 15 thus drawn on the object sensing image 7A with ii) a previously memorized object sensing pattern image, the object recognizer 8 recognizes the object 15.

Figure 5A:
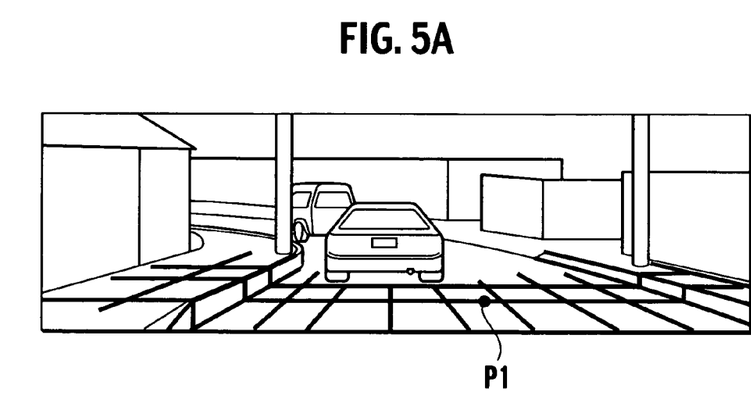
FIG. 5 is a principle drawing for obtaining a distance from an original point to the irradiation pattern in a distance sensing image.

The distance sensor 9 measures the distance D (from the vehicle V [original point 0] to the object 15) recognized by the object recognizer 8. As shown in FIG. 5A, the distance D from an original point 0 to a point P1 where the irradiation pattern P is irradiated in the distance sensing image 5A is to be calculated.

<Method for Measuring Distance D from Original Point 0 to Point P1>

Hereinafter, a method for measuring the distance D from the original point 0 to the point P1 is to be set forth.

Figure 5B:
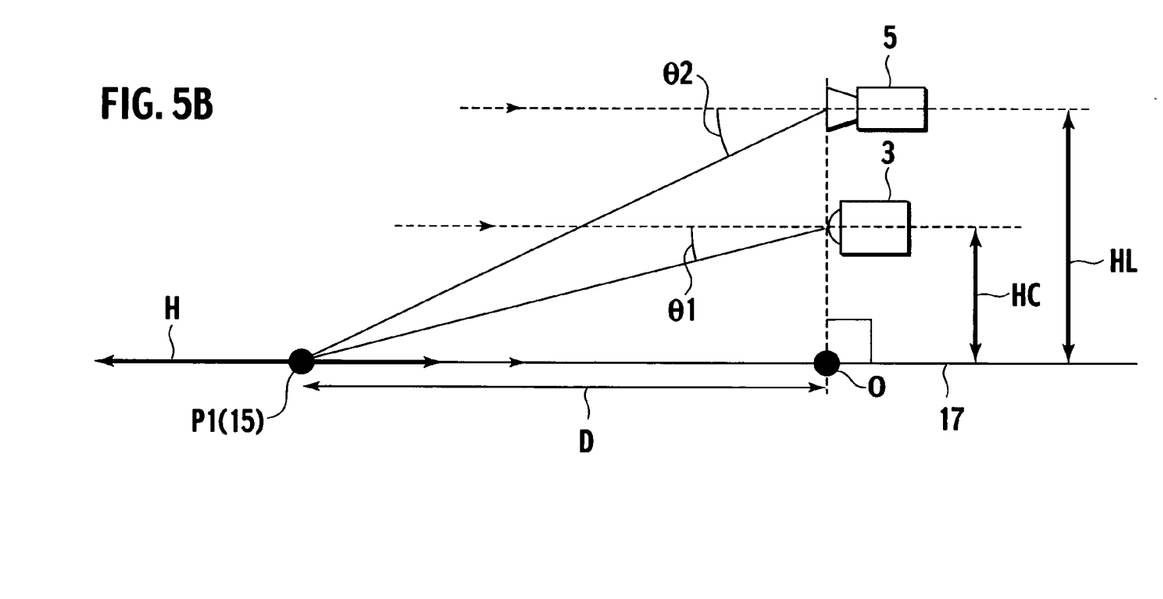

FIG. 5B shows the following parameters:

HC denotes a setting height of the irradiator 3 from a road face 17.

HL denotes a setting height of the image pickup part 5 from the road face 17.

D denotes the distance from the point P1 to the original point 0 which is an intersection between 1) the road face 17 and 2) a vertical line extending downward from the image pickup part 5 (or the irradiator 3) to the road face 17.

θ1 denotes an angle (irradiating direction) at which the irradiator 3 is irradiated toward the point PI.

θ2 denotes an angle (image pickup direction) at which the image pickup part 5 picks up the image of the point P1.

The above parameters are defined by the following expression (1) and expression (2):

$$\tan \theta1 = HC/D \qquad \text{Expression (1):}$$

$$\tan \theta2 = HL/D \qquad \text{Expression (2):}$$

From the equation (1) and equation (2), the distance D is expressed by the following expression (3).

$$D = (HC-HL)/(\tan \theta1 - \tan \theta2) \qquad \text{Expression (3):}$$

From the above expression (3), the distance D from the original point 0 to the point P1 can be calculated based on the above known parameters. After the distance D to the object 15 (point P1) is calculated, the distance sensor 9 outputs distance sensing data 9A to the display 10, so as to display the distance D on the object sensing image 7A to be displayed on the display 10.

The display 10 is a typical motor for displaying the object sensing image 7A inputted from the image generating part 7 and the distance sensing data 9A inputted from the distance sensor 9.

According to the first embodiment of the present invention, the administrative processor 2 makes the following operations:

1) with the irradiation pattern P irradiated, obtaining the distance sensing image 5A by picking up the image at the certain period, 2) from the thus obtained distance sensing image 5A, extracting the irradiation image 6A having the period substantially equal to the irradiation period, and 3) obtaining the object sensing image 7A by taking the difference between the distance sensing image 5A and the irradiation image 6A (i.e., 7A=5A−6A).

The above operations can bringing about an image which is capable of keeping serial property of the object 15 in the image, without decreasing frame rate.

Second Embodiment

Figure 6:
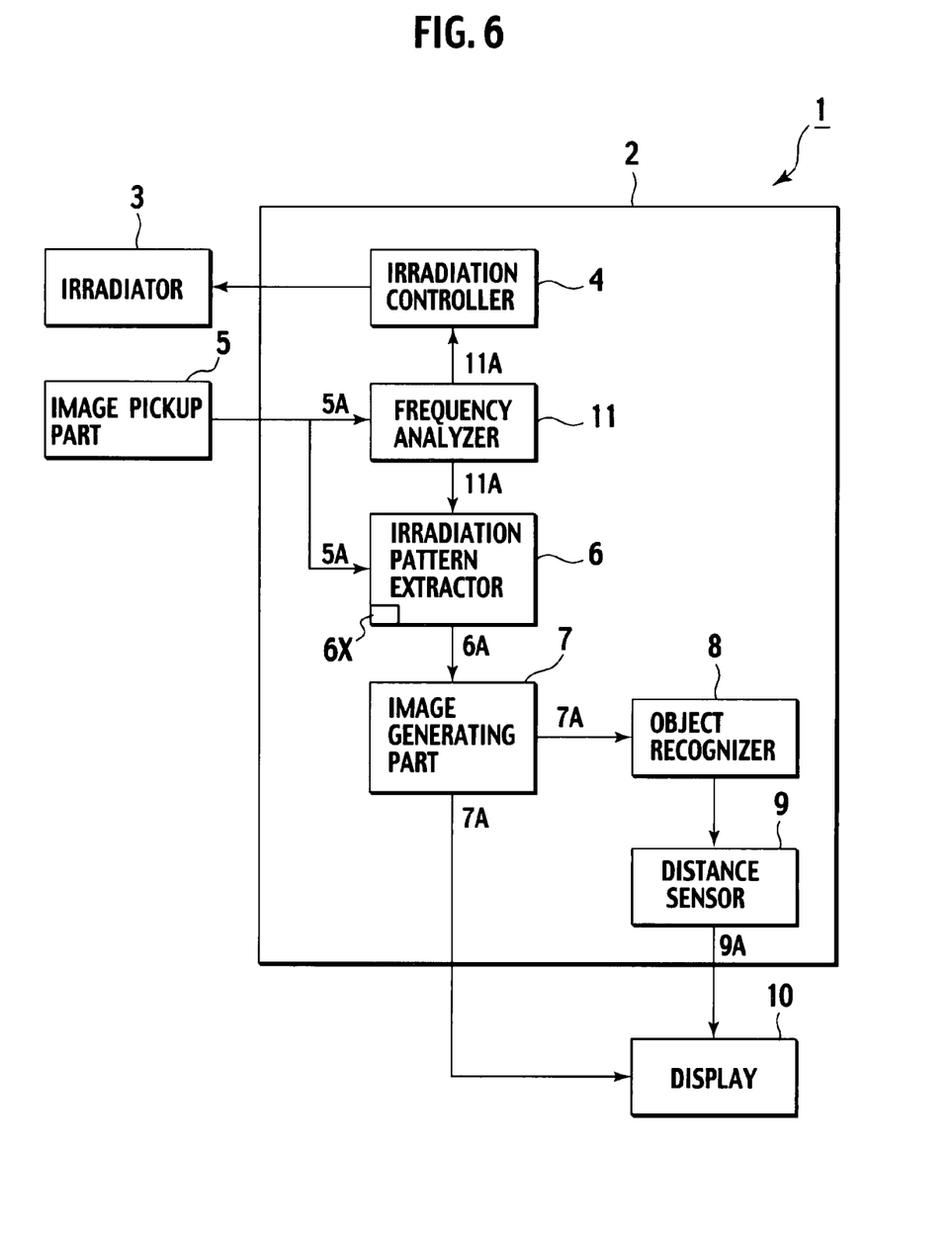
FIG. 6 is a block diagram of an image processor, according to a second embodiment of the present invention.

Then, a block diagram of the image processor 1 is to be explained referring to FIG. 6, according to a second embodiment of the present invention. Herein, explanations about structural elements like those of the image processor 1 according to the first embodiment are to be omitted, therefore different structural elements only are to be explained.

[General Structure of Image Processor 1]

As shown in FIG. 6, the image processor 1 according to the second embodiment of the present invention mainly includes the irradiator 3, the irradiation controller 4, the image pickup part 5, the irradiation pattern extractor 6, the image generating part 7, the object recognizer 8, the distance sensor 9, the display 10, a frequency analyzer 11, and the administrative processor 2. The administrative processor 2 administratively controls each of the above elements of the image processor 1.

[Details of Each Structural Element]

The irradiation pattern extractor 6 according to the first embodiment of the present invention uses the band pass filter that is fixed. Meanwhile, the irradiation pattern extractor 6 according to the second embodiment of the present invention uses a variable band pass filter capable of varying extracted frequency bands.

The frequency analyzer 11 analyzes frequency in the distance sensing image 5A inputted to the image pickup part 5, and then inputs an analysis result 11A to the irradiation controller 4 and the irradiation pattern extractor 6.

<Operations of Frequency Analyzer 11>

Hereinafter, operations of the frequency analyzer 11 are to be set forth.

For example, the distance sensing image 5A (or "original image"), as the case may be, includes the external light which is caused by i) a light from a commercial alternating current power source of 50 Hz or 60 Hz, ii) a mercury lamp lit by high frequency control, and the like. When the irradiation period of the irradiation pattern P accidentally coincides with a lightening period of the external light included in the distance sensing image 5A, the band pass filter of the irradiation pattern extractor 6 cannot distinguish the irradiation pattern P (irradiation image 6A) from the external light. From the distance sensing image 5A, the irradiation pattern extractor 6 removes both the irradiation pattern P (irradiation image 6A) and the external light, thus making it difficult to obtain the object sensing image 7A.

Then, the frequency analyzer 11 allows the irradiation controller 4 to control such that the irradiation pattern P of the irradiator 3 is set to have the irradiation period different from a period of a frequency component (i.e., lightening period) of the external light. Moreover, the frequency analyzer 11 sets the variable band pass filter of the irradiation pattern extractor 6 in conformity with the irradiation period of the irradiation pattern P. The above operations of the frequency analyzer 11 allow the irradiation pattern extractor 6 to extract the irradiation pattern P (irradiation image 6A), even when the external light having the lightening period coinciding with the irradiation period is included in the distance sensing image 5A.

Moreover, using a synchronous detector 6X for the irradiation pattern extractor 6 such that a signal synchronous with the irradiation period is inputted from the irradiation controller 4 to the synchronous detector 6X can likewise extract the irradiation pattern P (irradiation image 6A).

Third Embodiment

Figure 7:
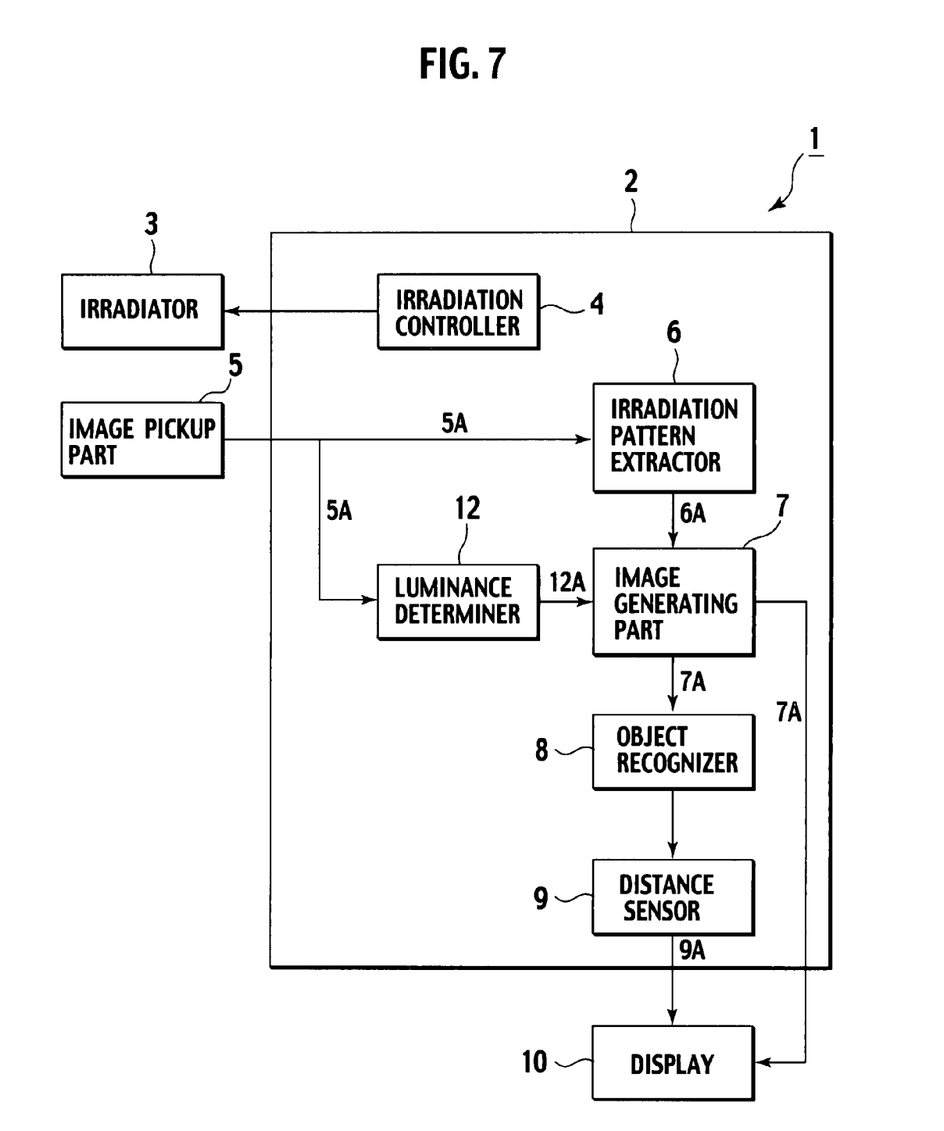
FIG. 7 is a block diagram of an image processor, according to a third embodiment of the present invention.

Then, a block diagram of the image processor 1 is to be explained referring to FIG. 7, according to a third embodiment of the present invention. Herein, explanations about structural elements like those of the image processor 1 according to the first and second embodiments are to be omitted, therefore different structural elements only are to be explained.

[General Structure of Image Processor 1]

As shown in FIG. 7, the image processor 1 according to the third embodiment of the present invention mainly includes the irradiator 3, the irradiation controller 4, the image pickup part 5, the irradiation pattern extractor 6, the image generating part 7, the object recognizer 8, the distance sensor 9, the display 10, a luminance determiner 12, and the administrative processor 2. The administrative processor 2 administratively controls each of the above elements of the image processor 1.

[Details of Each Structural Element]

The luminance determiner 12 determines whether a per-pixel luminance of the distance sensing image 5A inputted from the image pickup part 5 is larger or smaller than a certain luminance, then inputs a per-pixel luminance determination result 12A to the image generating part 7. The above certain luminance is, for example, about 30 (threshold) at 8 bit (gradation) when an image having SN ratio (signal-noise ratio) of about 20 dB at 8 bit (gradation) is picked up.

When implementing a difference operation between the distance sensing image 5A and the irradiation image 6A (i.e., 5A-6A) based on the determination result 12A of the luminance determiner 12, the image generating part 7 forbids the difference operation of a part of an image signal which part causes a per-pixel difference result of less than or equal to a noise level.

<Operations of Luminance Determiner 12 and Image Generating Part 7>

Hereinafter, operations of the luminance determiner 12 and image generating part 7 are to be set forth.

For example, when the object 15 in the image pickup area H has a low luminance, the distance sensing image 5A obtained by the image pickup part 5 is dark. Removing the irradiation image 6A from the distance sensing image 5A by the difference operation without a specific countermeasure may cause to the image signal a part less than or equal to the noise level. With this, the object sensing image 7A on the display 10, as the case may be, has a black collapse.

Therefore, the image generating part 7 is configured to make the following operations:

When implementing the difference operation based on the determination result 12A of the luminance determiner 12, the image generating part 7 forbids the difference operation of a part of the image signal which part causes the per-pixel difference result of less than or equal to the noise level.

<Flow Chart>

Figure 8:
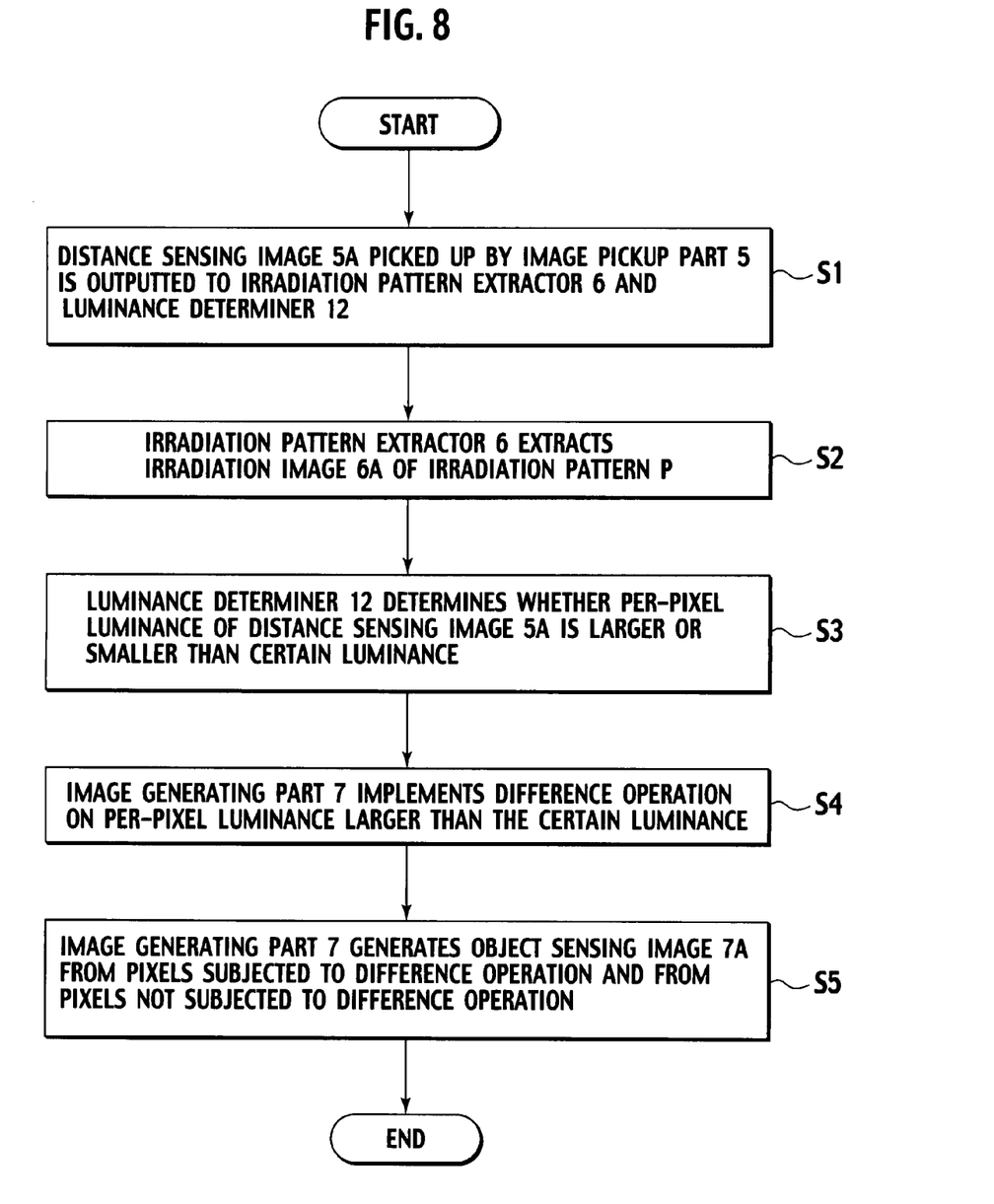
FIG. 8 is a flow chart showing a difference operation of an image generating part, which operation is implemented based on a determination result of a luminance determiner, according to the third embodiment of the present invention.

Then, a flow chart showing the difference operation is to be explained referring to FIG. 8 where the image generating part 7 implements the difference operation based on the determination result 12A of the luminance determiner 12.

<Step S1>

At step S1, the distance sensing image 5A picked up by the image pickup part 5 is outputted to each of the irradiation pattern extractor 6 and the luminance determiner 12.

<Step S2>

At step S2, the irradiation pattern extractor 6 extracts the irradiation image 6A of the irradiation pattern P.

<Step S3>

At step S3, the luminance determiner 12 determines whether the per-pixel luminance of the distance sensing image 5A is larger or smaller than the certain luminance.

<Step S4>

At step S4, the image generating part 7 implements the difference operation on the per-pixel luminance larger than the certain luminance.

<Step S5>

At step S5, the image generating part 7 generates the object sensing image 7A from the pixels subjected to the difference operation and from the pixels not subjected to the difference operation.

As set forth above, the image generating part 7 is configured to make the following operations:

When implementing the difference operation based on the determination result 12A of the luminance determiner 12, the image generating part 7 forbids the difference operation of a part of the image signal which part causes the per-pixel difference result of less than or equal to the noise level.

Therefore, the image generating part 7 can prevent the black collapse from causing to the object sensing image 7A.

Fourth Embodiment

Figure 9:
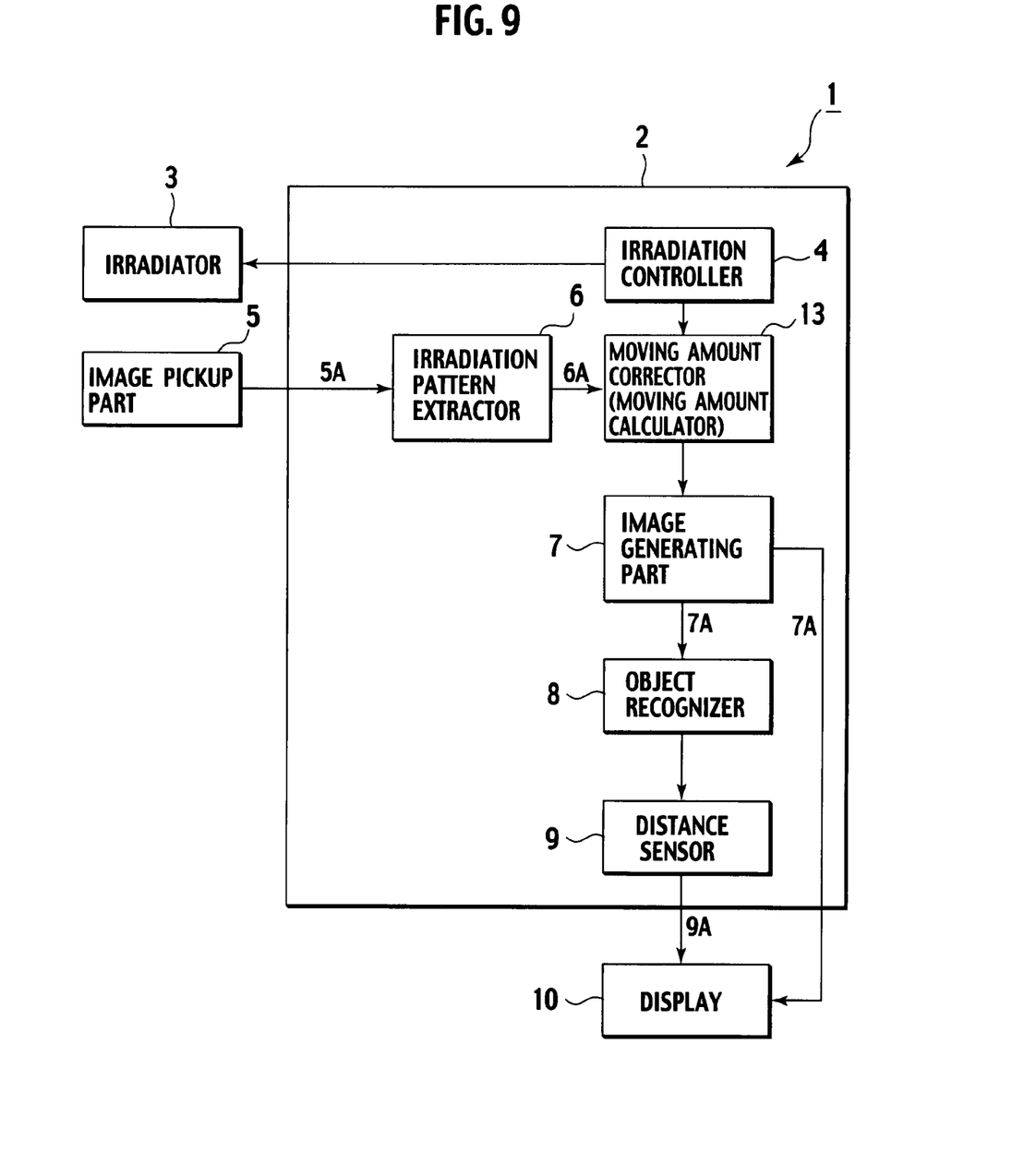
FIG. 9 is a block diagram of an image processor, according to a fourth embodiment of the present invention.

Then, a block diagram of the image processor 1 is to be explained referring to FIG. 9, according to a fourth embodiment of the present invention. Herein, explanations about structural elements like those of the image processor 1 according to the first to third embodiments are to be omitted, therefore different structural elements only are to be explained.

[General Structure of Image Processor 1]

As shown in FIG. 9, the image processor 1 according to the fourth embodiment of the present invention mainly includes the irradiator 3, the irradiation controller 4, the image pickup part 5, the irradiation pattern extractor 6, the image generating part 7, the object recognizer 8, the distance sensor 9, the display 10, a moving amount corrector 13, and the administrative processor 2. The administrative processor 2 administratively controls each of the above elements of the image processor 1.

[Details of Each Structural Element]

The moving amount corrector 13 is configured to have the following functions:

1) making a time-series calculation of moving amount of the image on the screen (serving as a moving amount calculator) based on:

i) the irradiation image 6A (of an irradiation pattern Pa) extracted by the irradiation pattern extractor 6 from a previously picked up distance sensing image 5A, and ii) the irradiation image 6A (of an irradiation pattern Pb) extracted by the irradiation pattern extractor 6 from a currently picked up distance sensing image 5A, and 2) based on the moving amount of the image thus calculated, correcting configuration (i.e., position and size) of the irradiation image 6A (of the irradiation pattern P) included in a next distance sensing image 5A.

<Operation of Moving Amount Corrector 13 (Moving Amount Calculator)>

Hereinafter, operations of the moving amount corrector 13 are to be set forth.

Figure 10A:
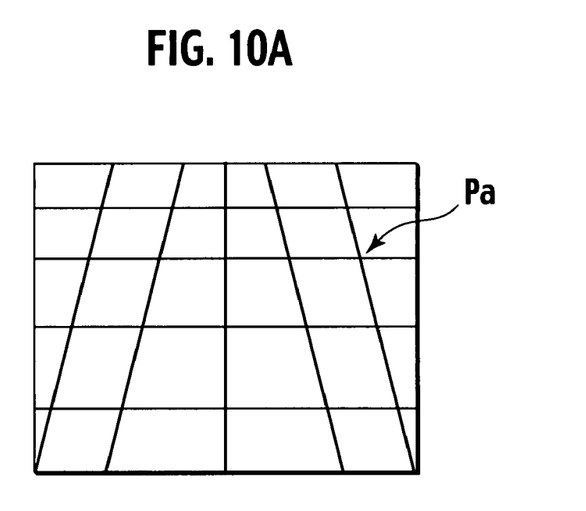

For example, irradiating a road R0 with a grid-shaped irradiation pattern when the vehicle V is making a stop and the road R0 has a small amount of relief forms a grid-shaped irradiation image on the road R0. Picking up the image of the grid-shaped irradiation pattern with the image pickup part 5 obtains the irradiation pattern Pa shown in FIG. 10A.

Figure 10B:
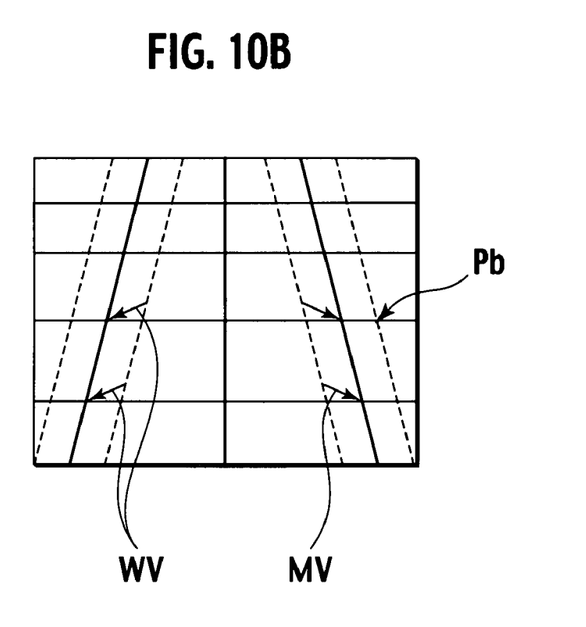
FIG. 10B shows an irradiation image of an irradiation pattern included in the distance sensing image at a current image pickup.
Figure 11:
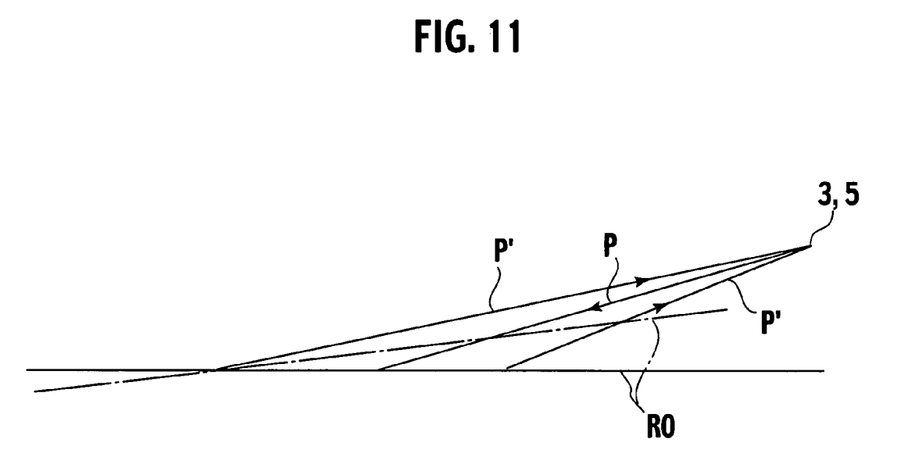
FIG. 11 shows a position (irradiator, camera) relative to a road.

Then, when a pitching and the like is caused to the vehicle V, the irradiator 3 and the image pickup part 5 each change in position relative to the road R0, as shown in FIG. 11. This brings about the irradiation image Pb shown in FIG. 10B, causing a deviation between i) the irradiation image 6A (of the irradiation pattern Pa) obtained through the previous distance sensing image 5A and ii) the irradiation image 6A (of the irradiation pattern Pb) obtained through the current distance sensing image 5A. In FIG. 11B, MV and WV each denote moving amount (deviation) of a per-pixel irradiation image.

When the image generating part 7 implements the difference operation (i.e., removing the irradiation image 6A from the current distance sensing image 5A) without taking account of the moving amount MV or moving amount WV, an operation speed of the image generating part 7 fails to catch up with an image pickup speed. Therefore, this removes an area where the irradiation pattern P of the current distance sensing image SA is not irradiated, resulting in decreased image quality.

Herein, the moving amount corrector 13 is configured to implement the following operations:

1) calculating the moving amount MV, WV of the image, based on:

i) the irradiation image 6A of the irradiation pattern Pa extracted from the previous distance sensing image 5A, and ii) the irradiation image 6A of the irradiation pattern Pb extracted from the current distance sensing image 5A, 2) estimating a pixel position where the irradiation pattern P included in the next distance sensing image 5A is present, and 3) thereby removing, from the current distance sensing image 5A (original image), the irradiation image 6A included in the next distance sensing image 5A.

Thereby, even when the position of the irradiator 3 or image pickup part 5 relative to the road R0 is changed, the moving amount corrector 13 works to display a high quality image on the display 10.

Although the present invention has been described above by reference to four embodiments, the present invention is not limited to the four embodiments described above. Modifications and variations of the embodiments described above will occur to those skilled in the art, in light of the above teachings.

This application is based on prior Japanese Patent Application Nos. P2006-218572 (filed on Aug. 10, 2006 in Japan) and P2007-189316 (filed on Jul. 20, 2007 in Japan). The entire contents of the Japanese Patent Application Nos. P2006-218572 and P2007-189316 from which priorities are claimed are incorporated herein by reference, in order to take some protection against translation errors or omitted portions.

The scope of the present invention is defined with reference to the following claims.

What is claimed is:

1. An image processor, comprising:
an image pickup part configured to pick up a pickup image of a certain area;
an irradiator configured to irradiate at least a part of the certain area for the pickup image picked up by the image pickup part;
an extractor configured to extract, as an irradiation image, a light irradiated from the irradiator, the irradiation image being extracted from the pickup image picked up by the image pickup part;
an image generating part configured to generate an irradiation removed image which is obtained by removing the irradiation image from the pickup image;
an object recognizer configured to recognize an object in the certain area, based on the irradiation removed image generated by the image generating part;
a distance sensor configured to sense a distance to the object recognized by the object recognizer; and
an administrative processor configured to administratively control each of the image pickup part, the irradiator, the extractor, the image generating part, the object recognizer, and the distance sensor, the administrative processor including:
a frequency analyzer configured to analyze a frequency component of a signal of an original image which is the pickup image including an external light and obtained by the image pickup part, and
a controller configured to:
control the irradiator such that the irradiator is set to have an irradiation period different from a period of the frequency component of the external light obtained by the frequency analyzer, and
control the extractor to be in conformity with the irradiation period of the irradiator.

2. The image processor according to claim 1, wherein the extractor is a variable band pass filter.

3. The image processor according to claim 2, wherein the frequency analyzer is configured to set the variable band pass filter to conform to the irradiation period of the irradiator.

4. The image processor according to claim 1, wherein the extractor includes a synchronous detector configured to extract an irradiation pattern of the irradiation image, by allowing a signal synchronous with the irradiation period of the irradiator to be inputted from the controller to the synchronous detector.

5. An image processor, comprising:
an image pickup part configured to pick up a pickup image of a certain area;
an irradiator configured to irradiate at least a part of the certain area for the pickup image picked up by the image pickup part;
an extractor configured to extract, as an irradiation image, a light irradiated from the irradiator, the irradiation image being extracted from the pickup image picked up by the image pickup part;
an image generating part configured to generate an irradiation removed image which is obtained by removing the irradiation image from the pickup image;
an object recognizer configured to recognize an object in the certain area, based on the irradiation removed image generated by the image generating part;
a distance sensor configured to sense a distance to the object recognized by the object recognizer; and
a luminance determiner configured to determine a per-pixel luminance of a signal of the pickup image which is an original image,
wherein the image generating part implements a difference operation between the pickup image and the irradiation image based on a determination result of the luminance determiner, wherein the image generating part forbids the difference operation of a part of an image signal which has a determination result of less than or equal to a noise level.

6. An image processor, comprising:
an image pickup part configured to pick up a pickup image of a certain area
an irradiator configured to irradiate at least a part of the certain area for the pickup image picked up by the image pickup part;
an extractor configured to extract, as an irradiation image, a light irradiated from the irradiator, the irradiation image being extracted from the pickup image picked up by the image pickup part;
an image generating part configured to generate an irradiation removed image which is obtained by removing the irradiation image from the pickup image;
an object recognizer configured to recognize an object in the certain area, based on the irradiation removed image generated by the image generating part;
a distance sensor configured to sense a distance to the object recognized by the object recognizer,
an image moving amount calculator configured to make a time-series calculation of a moving amount of an image on a screen based on:
the irradiation image extracted by the extractor from a pickup image picked up previously, and
the irradiation image extracted by the extractor from a pickup image picked up currently; and
a moving amount corrector configured to correct the following, based on the moving amount obtained by the image moving amount calculator:
a position of the irradiation image on the screen and a size of the irradiation image, the irradiation image being included in the pickup image obtained at a next time,
wherein the image processor is configured to remove, from the current pickup image, the irradiation image included in the next pickup image.

7. An image processing method, comprising:
picking up a pickup image of a certain area;
irradiating at least a part of the certain area for the pickup image picked up by the picking up operation;
extracting, as an irradiation image, a light irradiated from the irradiating operation, the irradiation image being extracted from the pickup image picked up by the picking up operation;
generating an irradiation removed image which is obtained by removing the irradiation image from the pickup image;
recognizing an object in the certain area, based on the irradiation removed image generated by the generating operation;
sensing a distance to the object recognized by the recognizing operation;

making a time-series calculation of a moving amount of an image on a screen based on:
- the irradiation image extracted by the extracting operation from the pickup image picked up previously; and
- the irradiation image extracted by the extracting operation from the pickup image picked up currently; and correcting the following, based on the moving amount obtained by the image moving amount calculating operation:
- a position of the irradiation image on the screen and a size of the irradiation image, the irradiation image being included in the pickup image obtained at a next time, wherein the image processing method removes, from the current pickup image, the irradiation image included in the next pickup image.

8. An image processor, comprising:

means for picking up a pickup image of a certain area;

means for irradiating at least a part of the certain area for the pickup image picked up by the means for picking up;

means for extracting, as an irradiation image, a light irradiated from the means for irradiating, the irradiation image being extracted from the pickup image picked up by the means for picking up;

means for generating an irradiation removed image which is obtained by removing the irradiation image from the pickup image;

means for recognizing an object in the certain area, based on the irradiation removed image generated by the means for generating; and means for sensing a distance to the object recognized by the means for recognizing; and means for making a time-series calculation of a moving amount of an image on a screen based on:
- the irradiation image extracted by the means for extracting from the pickup image picked up previously; and
- the irradiation image extracted by the means for extracting from the pickup image picked up currently; and means for correcting the following, based on the moving amount obtained by the means for making a time-series calculation of a moving amount:
- a position of the irradiation image on the screen and a size of the irradiation image, the irradiation image being included in the pickup image obtained at a next time, wherein the image processor removes, from the current pickup image, the irradiation image included in the next pickup image.

* * * * *